May 13, 1952  R. H. DICKE  2,596,538
POWER TRANSMISSION
Filed July 24, 1946  5 Sheets-Sheet 1
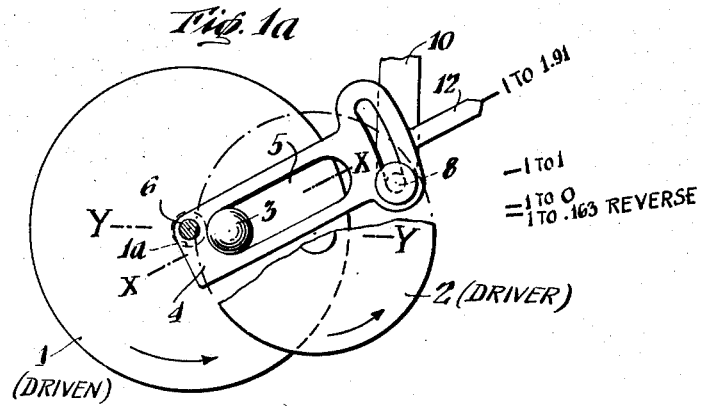
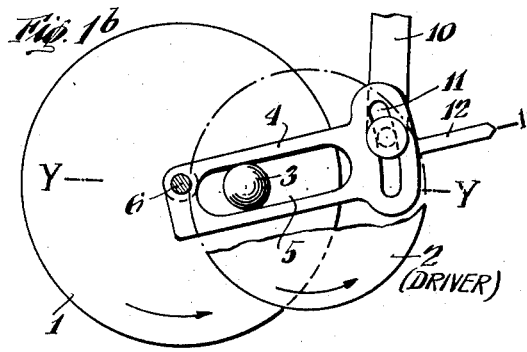
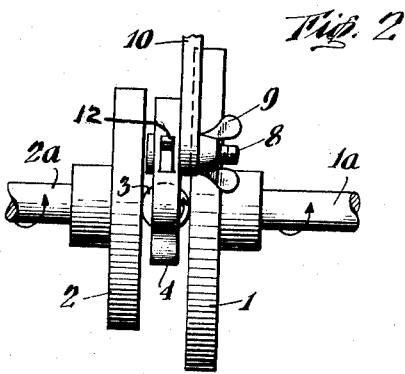
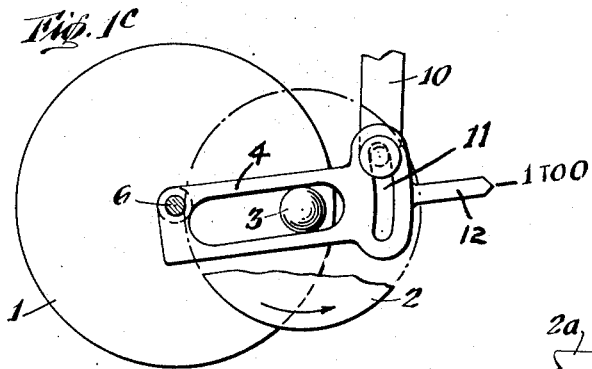
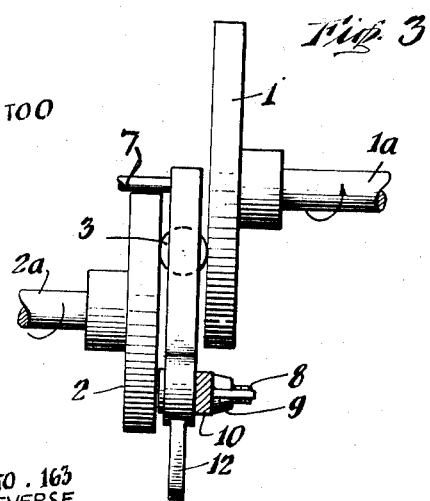
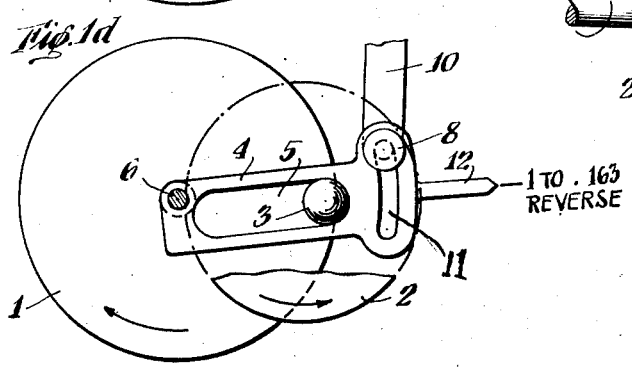
INVENTOR.
Robert H. Dicke
BY
ATTORNEYS INVENTOR.
Robert H. Dicke
BY A. A. Dicke
J. F. Padlon
ATTORNEYS May 13, 1952  R. H. DICKE  2,596,538
POWER TRANSMISSION
Filed July 24, 1946  5 Sheets-Sheet 3

INVENTOR.
Robert H. Dicke
BY A. A. Dicke
J. T. Padlon
ATTORNEYS

May 13, 1952  R. H. DICKE  2,596,538
POWER TRANSMISSION
Filed July 24, 1946  5 Sheets-Sheet 4
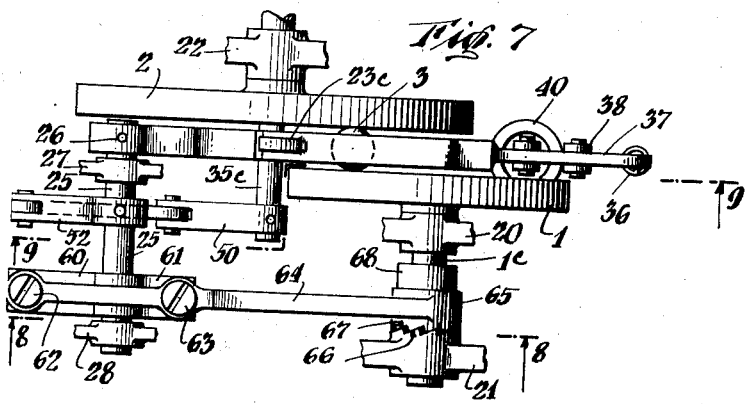
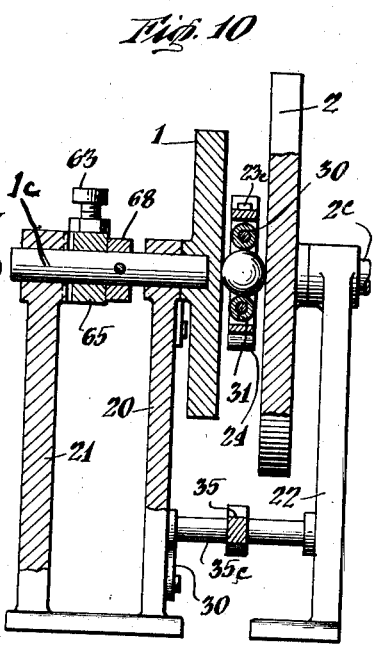
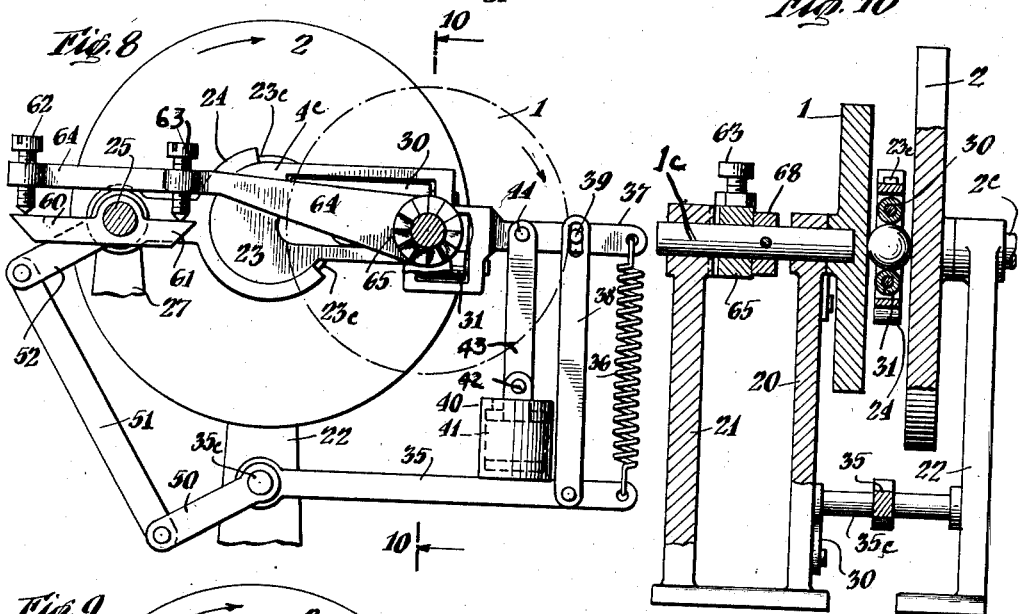
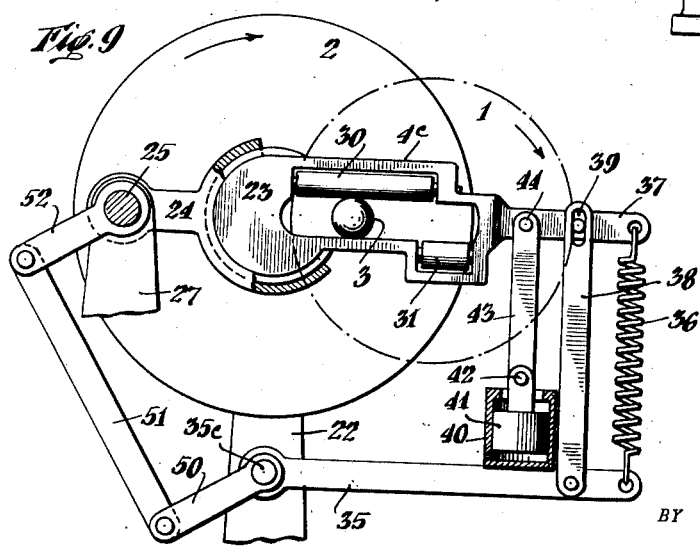
INVENTOR.
Robert H. Dicke
BY A. A. Dicke
J. F. Padlon
ATTORNEYS May 13, 1952
R. H. DICKE
2,596,538
POWER TRANSMISSION
Filed July 24, 1946
5 Sheets-Sheet 5
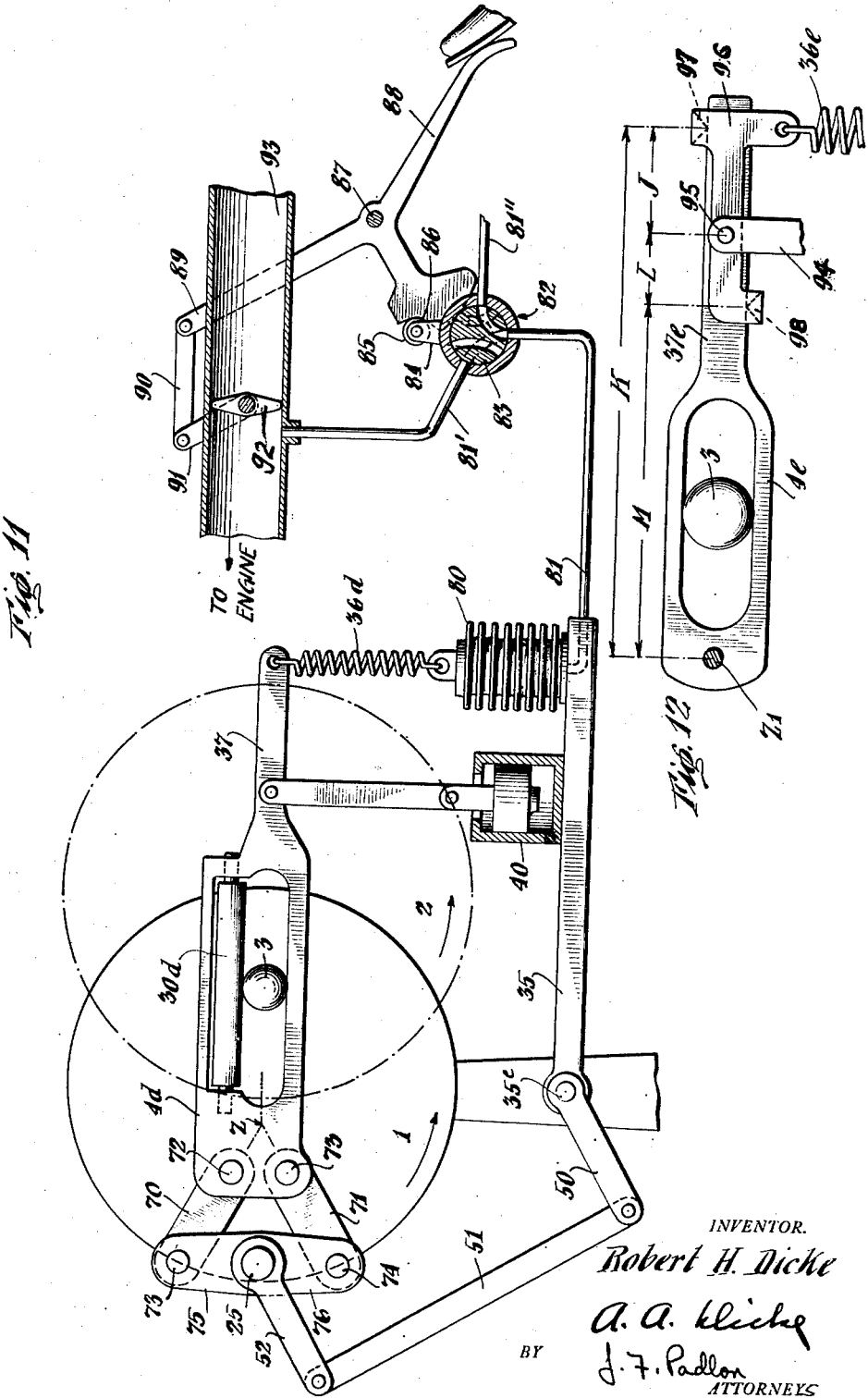
INVENTOR.
Robert H. Dicke
BY
A. A. Klich
J. F. Padlon
ATTORNEYS Patented May 13, 1952

2,596,538

UNITED STATES PATENT OFFICE 2,596,538

POWER TRANSMISSION

Robert H. Dicke, Princeton, N. J., assignor of one-half to Allen A. Dicke, Montclair, N. J.

Application July 24, 1946, Serial No. 685,862

12 Claims. (Cl. 74—190.5)

This invention relates to improvements in power transmissions and has for an object to provide an improved transmission of the friction type providing infinitely variable speed ratios.

Another object is to provide such a transmission including a rolling element, such as a ball, pressed between two rotatable members, preferably disks, and a constraining element, such as a generally-rectangular cage, adapted to constrain translatory movement of the ball to a generally straight line.

Another object is to provide such a device in which the constraining cage member may be adjusted to various positions either by the application of an external force or by the torque resulting from the forces transmitted by the transmission.

Another object is to provide such a device in which the movement of the constraining element or cage is opposed by a reaction force originating in a spring, or equivalent means, so that the position of the constraining element is dependent upon the torque transmitted.

Another object is to so arrange and co-ordinate the parts of such a transmission that the intermediate member, such as a ball, will be caused to roll from one position to the other, whereby all sliding movement between the ball and the disks is eliminated.

Another object is to provide such a device in which the ball will, in normal operation of the device, roll about varying axes so that all parts of the surface of the ball will at one time or another serve as contact points between the disks and the ball so that wear of the ball may be evenly distributed.

Another object is to provide such a device in which the parts are so constructed and arranged that when the constraining member is moved to a certain position the ball will traverse to a definite corresponding position so as to be set to produce a definite angular velocity ratio between the disks.

Another object is to provide a variable speed transmission in which the speed ratio may be changed while the transmission is in operation, the parts being so constructed and arranged that an instantaneous change in the position of the speed ratio determining member results not in an instantaneous change in speed ratio but in a gradual smoothly varying change in speed ratio asymptotically approaching the final value determined by the new position of the speed ratio determining member.

Another object is to provide a variable speed transmission in which the transmission ratio is automatically and continuously adjusted in such a way as to keep the input (or output) torque of the transmission at some predetermined value.

Another object is to so construct and arrange the constraining element that a certain angular velocity ratio will be achieved while the torque (either of the driving disk or the driven disk) is below a certain predetermined value but that when the torque exceeds that value the constraining member will be so adjusted that the ball will roll to such a position as to change the angular velocity ratio in such a manner as to reduce the torque to the predetermined value.

Another object is to provide an improved transmission of this general type including means for pressing the disks toward each other by a force substantially directly proportional to the tangential force acting on the ball whereby the force acting on the ball at all times is the minimum required force.

Another object is to provide means for automatically applying variable external force or forces to the constraining element to control the position of said element, and therefore the position of the ball, which external forces may be proportional to certain characteristics of a prime mover, such as an internal combustion engine, whereby the transmission will be automatically adjusted for that angular velocity ratio which will permit the prime mover to operate under optimum conditions, such as maximum efficiency or power.

Further objects and advantages of this invention will be apparent from consideration of the specification as illustrated by the accompanying drawings of possible embodiments of the invention, in which drawings:

Figs. 1a, 1b, 1c, and 1d are side views of a power transmission embodying the present invention in which the constraining element and the force-transmitting ball are shown in different positions to give output speeds as follows: maximum forward, 1 to 1 forward, neutral, and reverse, respectively;

Fig. 2 is a front view of said device as the parts appear in Fig. 1b;

Fig. 3 is a top view of the parts as they appear in Figs. 1b and 2;

Figure 5A:
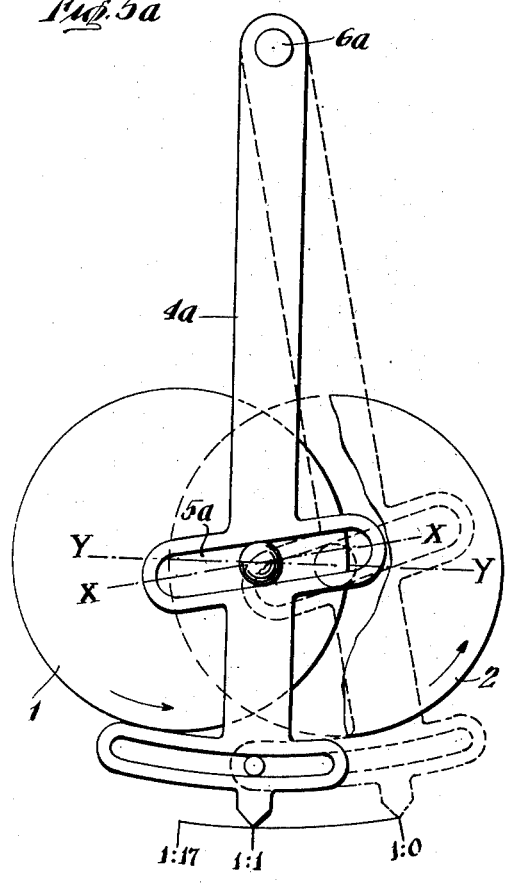
Figure 5B:
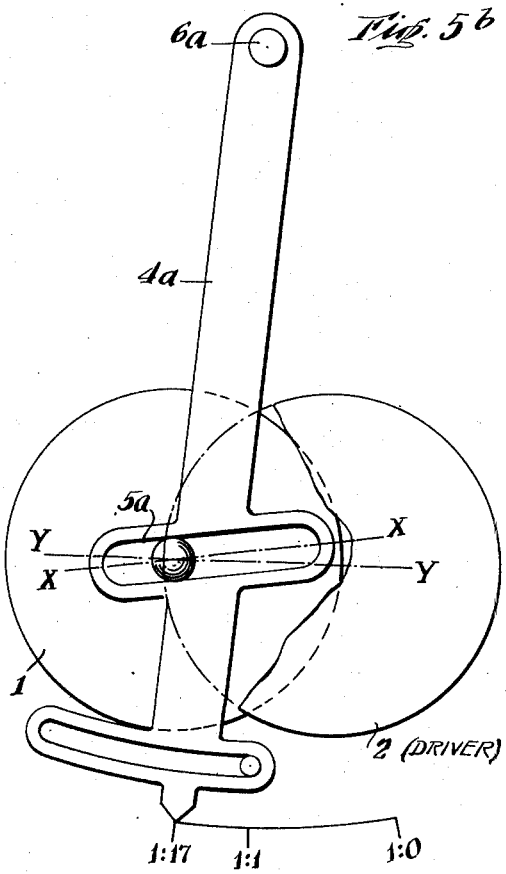
Figure 6:
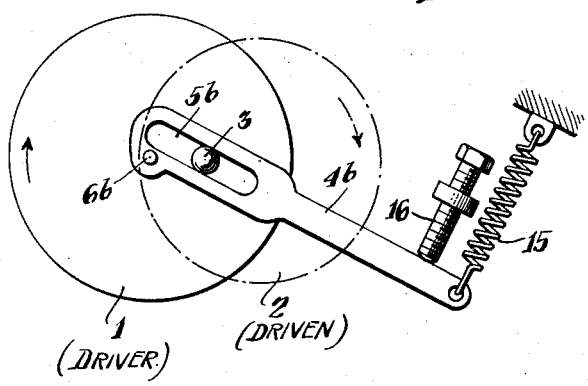

Figs. 4a, 4b, 4c, 4d, 4e, 4f, and 4g comprise diagrams used in the mathematical discussion appearing hereinafter;

Figs. 5a and 5b illustrate a modified form of such a power transmission of the fixed ratio type, i. e., where the ball will roll to a definite position for each position of the constraining element, the parts being shown in Fig. 5a in full lines, in the 1 to 1 ratio position, and in dotted lines in the neutral position, whereas in Fig. 5b the parts are shown in position to give maximum output speed;

Fig. 6 illustrates such a transmission arranged to operate as a fixed ratio transmission for input torques less than some critical amount, the transmission becoming torque responsive at the critical torque, automatically varying the transmission ratio to limit the input torque to substantially this critical value.

Fig. 7 is a top view of such a transmission arranged to be automatically responsive to torque and also provided with automatic compression-adjusting means to press the disks against the ball with a force proportional to the force applied tangentially to the ball;

Fig. 8 is a view of the form of Fig. 7 taken along the line 8—8 of Fig. 7;

Fig. 9 is a view similar to Fig. 8 taken along the line 9—9 of Fig. 7;

Fig. 10 is a vertical cross-sectional view taken along the line 10—10 of Fig. 8;

Fig. 11 illustrates a slightly modified form of transmission in which a torque is applied to the constraining element from an external source, such as the vacuum existing in the intake passages of an internal combustion engine;

Fig. 12 is a fragmentary view of a modified form of cage-control means.

Referring to said figures, and particularly to Figs. 1a to Fig. 3, the numeral 1 designates a disk mounted upon a shaft 1a for rotation therewith, said shaft being journaled in suitable bearings, not shown. 2 indicates a similar disk supported upon for rotation with shaft 2a journaled in suitable bearings, not shown. Between said disks is the ball 3, the disks being pressed tightly against the ball by suitable force. The ball is preferably made of hard wear-resistant steel, such as the balls used in accurate ball bearings, and the disks, or at least the working faces thereof, are made of similar material, or material of the type commonly used in races for ball or roller bearings.

In the form shown in Figs. 1a to 3, the disk 2 is assumed to be the driving and disk 1 the driven member and the direction of rotation is assumed to be as indicated by the arrows. It will be noted that if disk 2 is rotated in the direction indicated, ball 3 will rotate, as shown in Fig. 2, causing the disk 1 to rotate, as indicated. Since one side of the ball moves downwardly at a certain speed, the diametrically opposite part thereof moves upwardly at the same speed. Assuming no slippage, the tangential speed of the disks at the points of contact with the ball must always be the same. Therefore, assuming the driver to operate at constant speed, the speed of the driven disk will be directly proportional to the distance of the ball from the center of the driving disk and inversely proportional to its distance from the driven disk.

In the position shown in Fig. 1b, the ball 3 is equi-distant from the centers of disks 1 and 2, with the result that a 1 to 1 drive ratio is achieved.

In Fig. 1c the ball is in line with the axis of the driving disk 2, with the result that the ball 3, and therefore the disk 1, are stationary, providing a 1 to 0 (or neutral) drive ratio.

In Fig. 1d the ball is shown as having passed beyond the axis of disk 2, resulting in a reverse drive. The position of the ball is determined by the setting of the constraining element which, in the form shown, consists of a cage 4 provided with a ball-receiving slot 5 and is shown pivoted at 6 on a pin 7 (Fig. 3) carried by a support, not shown. The angular position of cage 4 is held fixed as by means of a clamping bolt 8 and wing nut 9 carried by a support 10 and located in arcuate slot 11 in the cage 4. Thus, by loosening wing nut 9, the cage may be set to the desired position and then clamped there.

Pointer 12 may be provided playing over a suitable scale to indicate the drive ratio selected. When the drive ratio is changed by swinging cage 4, the ball will be moved therewith without any sliding motion relative to the disks 1 and 2. However, the kinematic relations are such that the ball will promptly roll to that position where it is so spaced from the axes of the disks 1 and 2 as to provide the drive ratio called for. The position to which the ball will move is that at which its center coincides with the point of intersection between the line Y—Y (which lies in the plane common to the axes of disks 1 and 2) and the line X—X (which lies at the center of the slot 5 of cage 4).

In Fig. 1b this point of intersection is equidistant from the axes of disks 1 and 2; in Fig. 1a, the point of intersection is such that the ball 3 is substantially at the inner end of the slot; in Fig. 1c the point of intersection coincides with the axis of disk 2, giving the neutral relationship; in Fig. 1d the point of intersection lies to the right of the axis of disk 2, providing for a reverse drive. The reason why the ball rolls to this point of intersection and stays there will appear hereafter in the section devoted to the mathematical discussion.

It will be seen that by the construction shown in Figs. 1a to 3, a transmission is provided in which the drive ratio may be infinitely variable in response to the definite settings of the ball-restraining cage. In said form, the center of oscillation 6 coincides with the axis of the driven disk 1 but almost any other point of oscillation could be used. Thus, in Figs. 5a and 5b, the restraining cage is indicated by the numeral 4a and is pivoted at the point 6a. It will be noted, however, that the center line X—X of the cage slot 5a intersects the line of centers Y—Y at different points as the cage is swung about its pivot 6a. Thus, in Fig. 5a the point of intersection is midway between the centers of the disks and therefore a 1 to 1 drive ratio is achieved. In Fig. 5b, the point of intersection is quite close to the center of disk 1 so that a speedup drive ratio of 1 to 17 is achieved. By moving the cage to the position shown in dotted lines in Fig. 5a, a neutral position is arrived at.

In the form shown in Fig. 6 the disk 1 will be regarded as the driving and disk 2 as the driven member. The cage 4b is formed with a constraining slot 5b and is pivoted at 6b which coincides with the center of disk 1. The cage is biased in a counterclockwise direction by means of a spring 15 to a position determined by the setting of the adjustable stop 16. In the form shown, the stop is so adjusted as to provide for a 1 to 1 drive ratio, since the ball 3 is located midway between the axes of disks 1 and 2. If the force with which the ball 3 presses against the bottom of the slot 5b exceeds a certain value cage 4b will be moved clockwise against the action of spring 15, causing the ball 3 to roll to a new position closer to the axis of driver 1, thus producing a reduced drive ratio, thereby reducing the input torque required to provide a certain output torque. It is evident from an inspection of Fig. 6 that the torque which the driver 1 exerts on disk 2 is limited to a value determined by the spring 15. This form of application would be useful, for example, in an engine driven device, such as a lawn mower, tractor, plow, or ice crusher, or the like. Thus, if the load should be suddenly increased, as when the plow strikes a hard spot, the torque on the driver (and on the engine) will be increased. Unless relief is given promptly, by providing a more favorable drive ratio, the engine might be stalled. With the construction indicated, this is prevented since the speed ratio is automatically so adjusted as to provide the necessary increased torque on the driven disk without exceeding the input torque which the engine is able to deliver. Of course, many other applications will occur to those skilled in the art.

MATHEMATICAL CONSIDERATIONS

Before considering the more complex and more highly specialized illustrative forms shown in Figs. 7 to 11 inc., it is desirable to consider the invention in its more general aspects with particular reference to the diagrams shown in Figs. 4a to 4g inclusive. As in the forms previously discussed a steel ball 3 is clamped between two steel disks 1 and 2, the axes of which disks are parallel to each other and displaced from each other by a distance $a$ inches. For purposes of this part of the mathematical discussion the additional restraint on the ball produced by the rectangular cage member will be assumed to be omitted.

Figure 4A:
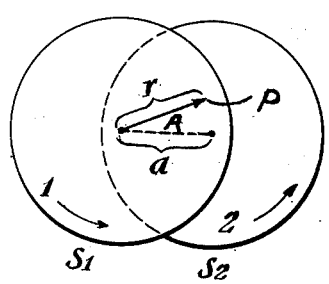
Figure 4B:
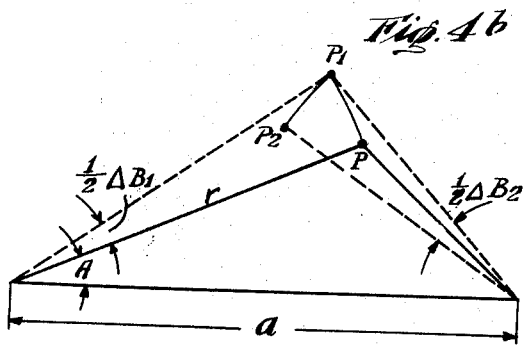

Assume the center of the ball is at the point P (Fig. 4a). The polar coordinates $r$ and $A$ will be used to designate the position P; $r$ is the distance from the center (in inches) and $A$ the angle (in radians) $r$ makes with the line joining the centers of the two disks. Assuming that, momentarily at least, the disks 1 and 2 are turning in the directions indicated by arrows at speeds of $S_1$ and $S_2$ radians per second, respectively, the problem is one of calculating the motion of the center of the ball, which will be expressed in terms of a radial velocity and an angular velocity. These velocities may be expressed as derivatives of $r$ and $A$ with respect to time. Thus $\frac{dr}{dt}$ = speed with which the ball moves out from center of disk 1 (inches/sec.)

$\frac{dA}{dt}$ = rate of change of angle $A$ (radians/sec.)

It can be shown that $$\frac{dr}{dt} = -\tfrac{1}{2}S_2 a \sin A \quad \text{(Equation 1)}$$

$$\frac{dA}{dt} = \tfrac{1}{2}(S_1+S_2) - \tfrac{1}{2}S_2 \frac{a}{r} \cos A \quad \text{(Equation 2)}$$

These equations are derived as follows (reference being made to Fig. 4b):

In a small interval of time $t$ the disk 1 will turn through an angle $$\Delta B_1 = S_1 \Delta t$$

Also the disk 2 will turn through an angle $$B_2 = S_2 \Delta t$$

Imagine these motions to be performed in two steps.

*Step 1.*—Disk 1 turns through angle $\Delta B_1$. The ball moves from P to P$_1$ along a circular path about the center of disk 1. Angle $A$ increases by $\tfrac{1}{2}\Delta B_1$. Note that the factor $\tfrac{1}{2}$ comes from the ball rolling on disk 2. Note that $r$ does not change.

*Step 2.*—Disk 2 turns through angle $\Delta B_2$. The ball moves from P$_1$ to P$_2$ along a circular path about the center of disk 2. Note that this changes both $A$ and $r$.

Angles B$_1$ and B$_2$ being small, the chord length PP$_1$ is nearly equal to $\tfrac{1}{2}r\Delta B_1$. In a similar way the projection of P$_1$P$_2$ on the radius vector $r$ which is the change in $r$ may be shown to be nearly $$\Delta r = -\tfrac{1}{2}a\Delta B_2 \sin A$$

If $\Delta r$ is divided by $\Delta t$, then the limit as $\Delta t$ approaches zero is $$\frac{dr}{dt} = -\tfrac{1}{2}\frac{dB_2}{dt}a \sin A$$

But $$\frac{dB_2}{dt} = S_2$$

Therefore $$\frac{dr}{dt} = -\tfrac{1}{2}S_2 a \sin A \quad \text{(Equation 1)}$$

In a similar way it can be shown that $$\frac{dA}{dt} = \tfrac{1}{2}(S_1+S_2) - \tfrac{1}{2}S_2 \frac{a}{r} \cos A \quad \text{(Equation 2)}$$

*Stationary solution.*—Equation 1 can have a stationary solution. A stationary solution is defined as one for which the position of the ball does not change with time. The condition for this is $$\frac{dr}{dt} = 0$$

$$\frac{dA}{dt} = 0$$

It is evident that Equation 1 requires that either $$\sin A = 0$$

or $$S_2 = 0$$

Note that if $S_2=0$ the Equation 2 requires that $S_1=0$, and both disks are stationary. This is a physically uninteresting case. If $\sin A=0$ then $A$=either $0$ or $\pi$ radians. The physical meaning is that the ball lies on the line passing through the axes of the two disks. The second equation then becomes $$0 = \frac{dA}{dt} = \tfrac{1}{2}(S_1+S_2) - \tfrac{1}{2}S_2 \frac{a}{r}$$

or $$S_1 + S_2 = S_2 \frac{a}{r}$$

Thus, if the speeds $S_1$ and $S_2$ are such that $$S_1 + S_2 = S_2 \frac{a}{r}$$

and $$A = 0 \text{ or } \pi \text{ radians}$$

the ball keeps rolling between the two disks without changing its position.

Figure 4C:
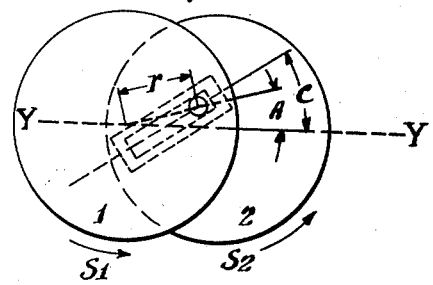
Figure 4D:
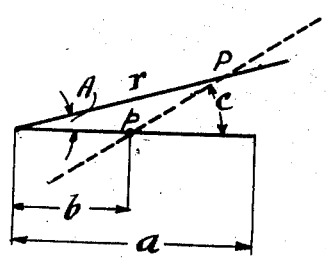
Figure 4E:
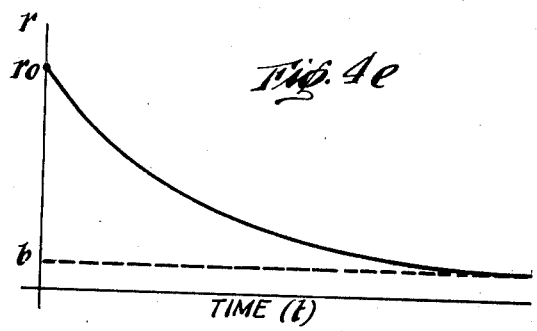

*Case I.*—In the preceding discussion the system under consideration has consisted of a ball rolling between two parallel noncoaxial disks. Consider now an additional constraint imposed upon the ball. In Fig. 4c the ball is shown constrained to lie in a fixed slot at an angle C with the line Y—Y intersecting the axes of the two disks. (See also Fig. 4d.) A qualitative picture of the behavior of this system is easily visualized. If the ball lies above the line Y—Y, the angle A satisfies $$0 < A < \frac{\pi}{2}$$

Then if $S_2$ is positive (i. e., disk 2 is rotating counterclockwise)

$$\frac{dr}{dt} = -\tfrac{1}{2}S_2 a \sin A < 0$$

and the ball moves in toward the center of disk 1. This continues until the ball reaches the crossing point $p$ at which $A=0$. At this point $$\frac{dr}{dt} = 0$$

and the ball no longer moves. In a similar way if the ball is below the line Y—Y, $r$ increases until the point $p$ is reached.

When angles A and C are small, $r$ and A are connected by the relation $$A = C\left(1 - \frac{b}{r}\right)$$

This combined with $$\frac{dr}{dt} = -\tfrac{1}{2}S_2 a \sin A$$

leads to a differential equation which (assuming $S_2$ constant) can be solved to give the time $t$ as a function of the radius $r$. This solution is $$t = -\frac{2}{S_2 aC}\left[r - r_0 + b \log \frac{r-b}{r_0-b}\right]$$

where $r = r_0$ when $t = 0$. If this equation is plotted it is found to have the form shown in Fig. 4e. Note that the ball starts out at $r = r_0$ and approaches the stationary point $r = b$ asymptotically.

Figure 4F:
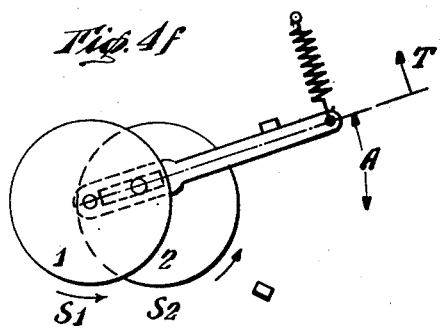
Figure 4G:
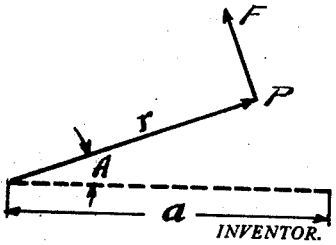

*Case II.*—Case I (Fig. 4c) was characterized by a fixed constraint on the ball. The motion of the ball was then determined by purely kinematical considerations. In this section a system will be considered in which the motion of the ball is determined partially by dynamical considerations. In Fig. 4f a system is shown consisting again of the two disks 1 and 2 and a spherical ball. However, in this case the constraint for the ball is a slot in a lever which is pivoted at one point. For convenience in analysis the pivot point is taken as the center of disk 1. The lever is acted on by a spring which produces a torque T about the pivot point. (It is assumed for simplicity in description that this torque T is independent of the angle A.) The lever exerts a force F on the ball. If the acceleration of the ball is small enough, inertial forces having their origin in the mass of the ball may be neglected. In this case the tangential force exerted by the ball on each one of the disks is just ½F. Thus it is seen that the torque exerted on the disk 1 by the ball is just ½T.

If the disk 2 is driven by an external power source at the speed $S_2$, the disk 1 is driven by the ball at a speed $S_1$. It is assumed that the disk 1 drives some external load. The torque applied to the external load must be either less than, equal to, or greater than ½T. If the load is less than ½T, the lever must lie against the upper limit stop. If the load torque is greater than ½T, the lever must lie against the lower limit stop. For the case of the equality it lies in between.

Imagine that the output torque is less than ½ T. The ball moves inward ($r$ decreases, see Equation 1) the speed $S_1$ increases relative to $S_2$ until the output torque becomes equal to ½ T. The angle A then becomes zero and the ball reaches a stationary position. Thus the mechanism is such that the ball automatically adjusts its position, increasing $S_1$, until the output torque is ½ T.

This system is characterized by an automatic speed regulation to keep the output torque equal to ½ T. It is evident that disk 1 may be driven and disk 2 may drive the load in which case the speed regulation is such as to keep the input torque constant.

*Figs. 7–10*

In this form, the disk 1 may be regarded as the driving disk and disk 2 as the driven one. On this assumption, the parts, as shown, will cause the ball 3 to assume a position to maintain constant the torque applied to disk 2, i. e., the output torque. Such a transmission will be useful, for example, in driving a positive displacement pump at the correct speed to maintain a constant fluid pressure irrespective of fluid demand. Such devices are required where a source of fluid at constant pressure is required. Since the torque required to drive such a pump is directly proportional to the pressure against which the pump works, fluctuations in pressure will be reflected as fluctuations in torque, which torque fluctuations will cause the transmission to automatically set itself for the drive ratio which will produce said constant torque.

Disk 1 is attached to shaft 1c which is journaled in bearings mounted on supports 20 and 21, whereas disk 2 rotates with shaft 2c mounted in bearings carried by supports 22 only one of which is shown. The ball-constraining cage 4c is shown as pivoted in line with the axis of disk 2. This is accomplished by forming its inner end 23 of circular conformation, preferably formed with an annular extension 23c received in a corresponding groove in a circular claw 24 which is connected to a shaft 25 as by means of a pin 26. The shaft is mounted in bearings carried by supports 27 and 28.

Whenever the output disk 2 rotates in the forward direction (clockwise, as viewed in Figs. 8 and 9), the ball 3 exerts a lifting force equal to twice the force acting tangentially on the ball. To reduce friction, the cage 4c is provided with an anti-friction roller 30 the ends of which are journaled in cage 4c, preferably on needle or roller bearings. A second roller 31 may be provided to take care of the situation where the ball has moved to the opposite side of the center of disk 1, at which time the ball 3 will exert a downward thrust on the cage. A downward thrust on roller 31, would, for steady operation, require a compressional force from the spring 36, shown for convenience as a spring under tension. It is obvious to one skilled in the art that the spring 36 could be replaced by any device capable of exerting a force in either one or both directions as, for example, the device shown in Fig. 12.

Suitable means are provided to control the pivotal position of cage 4c, including an arm 35 which is in fixed position and serves as an abutment for the spring 36, the other end of which is attached to the arm 37 forming part of the cage 4c. 38 is a link pivotally attached to the arm 35 and connected at its other end to the arm 37 by the pin and slot connection 39. In order to prevent excessive vibration of the cage, it may be desirable to provide a dashpot. This is shown as a cylinder 40 attached to the arm 35 provided with a piston 41 pivoted at 42 to the connecting rod 43 pivoted at 44 to the arm 37.

The parts are shown with the cage in its central position, in which position the ball 3 will have no tendency to translate in the slot of the cage 4c. This condition will exist while the output torque is just sufficient to extend the spring 36 the proper amount to permit the cage to take the position shown. If now, the output torque on disk 2 should be increased, spring 36 will be lengthened slightly, permitting the cage to rise, with the result that the ball will move to the right. This will cause the speed of the output shaft 2c to decrease, resulting in a drop in pressure against which the pump is working and therefore a decrease in the torque applied to the disk 2. This reduces the torque, tending to lift cage 4c, with the result that the cage will be pulled downwardly by spring 36. Likewise, when the pressure, against which the pump works, drops, as when fluid delivered thereby is allowed to escape, the spring 36 will draw the cage downwardly, causing the ball 3 to roll to the left, causing the speed of disk 2 to increase, whereby the pump is caused to operate more rapidly (assuming substantially constant input speed) and thereby restore the pressure against which the pump works. This automatic adjustment of cage 4c will occur continually and automatically to provide the proper drive ratio to the pump. If delivery from the pump is completely closed off, pressure will rise slightly above the predetermined value for a sufficiently long time to cause ball 3 to move to the right until it coincides substantially with the axis of disk 1 and shaft 1c, causing the pump to stop entirely. This condition probably would never be reached in practice because there would always be some leakage in the pump. In this manner, the pump will be driven just the necessary amount to maintain the pressure desired, resulting in a very efficient construction since the energy input will be only sufficient to take care of pump leakage and bearing and other small mechanical losses.

In those cases where it is desirable at times to reverse the rotation of the output shaft, i. e., to exert an output torque in the reverse direction, it is necessary to substitute a compressional force for the tension of the spring 36. It is obvious to one skilled in the art that the spring could be replaced by any one of a variety of devices for exerting a force in one or more directions. For example, the spring 36 could be replaced by a metallic bellows connected to an external pressure source. A vacuum applied to the bellows would cause an output torque in the clockwise sense, a positive pressure would cause an output torque in the counterclockwise sense.

BALL COMPRESSION MECHANISM

It is desirable to compress the ball between the disks 1 and 2 by an amount just sufficient to prevent slippage. Assuming a co-efficient of friction of 0.1, the force acting along the horizontal diameter of the ball should be ten times the force acting tangentially upon the ball, viz., five times the force by which roller 30, for example, bears against the ball 3. The structure shown in Figs. 7 to 10 is such as to utilize the lifting force of the ball on roller 30 (or the depressing force on roller 31) to apply a proportional compressive force upon the ball. The force of the ball on roller 30 is met by reacting forces acting downwardly as follows: (1) at the center of oscillation concentric with disk 2, (2) the spring 36, (3) reaction of the dashpot transmitted through link 43, and (4) reaction of link 38 if and when the pin reaches the end of its slot.

The force at the pivot axis develops a counterclockwise torque in shaft 25. Similarly, the upward forces (2, 3, and 4 above) apply torque to the arm 35 and therefore to the shaft 35c to which it is attached. The shaft 35c is mounted in suitable bearings and carries for movement therewith a crank arm 50 which, through link 51, connects with an arm 52 attached to shaft 25, with the result that the torque in shaft 25 is increased in proportion to the forces designated "2," "3," and "4" above. Since shaft 35c is directly below shaft 2c and arm 35 is parallel to the cage, and since arm 50 is of the same length as arm 52, the location of the ball 3 in its slot has no bearing upon the torque applied to shaft 25. This torque in shaft 25 may be utilized in any desired manner to apply compression to the ball. In the form shown, this is effected as follows: shaft 25 carries a double-ended arm 60, 61 (Figs. 7 and 8), against which bear preferably adjustable abutments, such as set screws 62, 63, carried by an arm 64 mounted for oscillation about the center of shaft 1c by means of a hub 65. The face of said hub is shown provided with a plurality of helical faces 66 which bear against cooperating helical faces 67 mounted on any stationary member, such as the support 21. The hub 65 is backed up by an abutment collar 68 carried by and rotating with shaft 1c. It is of course understood that an anti-friction thrust bearing should be utilized at this point. It will be understood that set screws 62 and 63 are so adjusted before a torque is applied to the transmission that arm 64 will be moved clockwise sufficiently far to apply a certain initial minimum compression to ball 3.

When the transmission is thereupon started against an output load, the initial upward thrust of the ball 3 will cause the cage 4c to receive an upward thrust serving directly to apply a counterclockwise torque to shaft 25. The balance of the upward thrust on cage 4c will act through spring 36, link 43, and possibly through link 38, upon lever 35, which, through shaft 35c, arm 50, link 51, and arm 52, to add to the counterclockwise torque in shaft 25. This will tend to lift the arm 61 and apply a thrust to set screw 63 which will, through arm 64, tend to turn the hub 65 clockwise (Fig. 8). Through the helical faces 66, 67, this torque will result in a thrust force in shaft 1c tending to press disk 1 against the ball 3 and to press the ball 3 against disk 2 by an additional force proportional to the upward thrust of ball 3 against roller 30. This mechanism will assure that the compression on the ball is always sufficient to prevent slippage but at the same time is not unnecessarily great, which results in a more efficient device and in less wear upon the ball, the disks, and the various bearings of the machine. It is, of course, to be understood that the parts are made so rigid that there is substantially no movement of arm 35, shaft 35c, arm 50, link 51, arm 52, shaft 25, lever 60, 61, arm 64, and hub 65. They merely serve to transmit varying forces without movement other than the infinitesimally small movements due to unavoidable flexing of the parts.

If the device of Figs. 7 to 10 is so adjusted that the ball passes to the right of the axis of disk 1, the ball will exert a downward thrust on roller 31. This will result in a clockwise torque in shaft 25. As a result, arm 60 (Fig. 8) will bear upwardly against set screw 62 and tend to lift arm 64 in the clockwise direction. Thus, it will be seen that whether the thrust of the ball on the cage is upward or downward, it will result in an application of compression to the ball, which compression is proportional to the thrust of the ball on the cage whether said thrust be upward or downward. While in the above discussion of the construction of Figs. 7 to 10, disk 1 was assumed to be the driver, it is, of course, to be understood that disk 2 may be the driver and disk 1 the driven element. In this event, the disk 2 would preferably be driven in the opposite direction and the control mechanism would act in such a manner that it would automatically select that speed ratio which would hold the input torque constant.

*Fig. 11*

This figure illustrates one form the invention may take as applied to an automobile transmission. In this case, disk 1 is assumed to be the driving member which is connected to be driven by the engine of an automobile or other power vehicle, such as a truck, tractor, tank, or the like. Disk 2 is connected to the vehicle advancing mechanism, such as the propeller shaft of an automobile. The mechanism is so arranged that the drive ratio will be automatically selected to maintain a constant input torque, which setting, however, is varied by other influences—the intake manifold pressure in the form illustrated. In said figure, the cage 4d is provided with a roller 30d to receive the reaction of the ball 3. Instead of pivoting the cage by the means shown in Figs. 7 to 10, a modified form of pivotal mounting therefor is shown. This consists of links 70 and 71 connected at 72 and 73, respectively, to the cage. The other ends of said links are connected respectively at 73 and 74 to the ends of the lever 75, 76 carried on the shaft 25 similar to the shaft 25 of Figs. 7 to 10. The axis of links 70 and 71 intersect at the point Z, with the result that the instantaneous point of oscillation of cage 4d is at Z. The point Z, in this form, is slightly to the left of the axis of disk 1.

Said shaft 25 carries an arm 52 connected to a link 51 which is connected at its other end to an arm 50 mounted on shaft 35c. Said shaft also carries an arm 35 upon which the dashpot 40 is mounted. These parts may all be similar to those of corresponding numbers in Figs. 7 to 10 inclusive.

In Fig. 11, the link 38 has been omitted because the dashpot 40 is shown of such construction as to serve as limit stops for the cage 4d and its extension arm 37. 36d represents a spring corresponding to spring 36 but its lower end is attached to a metal bellows 80 mounted upon the arm 35. The tension in spring 36d and therefore the input torque may be varied by changing the pressure in the metal bellows 80 relative to atmospheric pressure. Changes in pressure cause a change in length of the metal bellows and therefore vary the tension in spring 36d. (It is to be understood that the spring 36d may be omitted and a rigid connection substituted.)

The interior of bellows 80 connects with a tube 81 which may have a certain amount of flexibility to accommodate any slight change in position of lever 35. Tube 81 may be connected to any source of pressure or vacuum which will be controlled manually or otherwise. In the form shown, it is connected to a two-way valve 82 having a rotatable plug 83 to which is attached an arm 84 carrying a roller 85 which cooperates with the face of a cam 86 pivoted to a shaft 87 which may also carry the accelerator pedal 88 of a power vehicle. Said shaft 87 may also carry an arm 89 to which is connected a link 90, the other end of which is connected to an arm 91 connected to the butterfly throttle valve 92 in the intake conduit 93 of an internal combustion engine.

It will be seen that with the two-way valve in the position shown in dotted lines, the conduit 81 will be connected through the valve with conduit 81' which connects with the intake manifold. As is well known, the vacuum in an internal combustion intake conduit for a constant throttle position drops at a more or less constant rate as the load (torque) on the engine increases. By the means shown, advantage is taken of this fluctuation in vacuum to vary the pull on spring 36d and therefore the torque on the cage in such a manner as to cause the ball 3 to take that position which will give that drive ratio which will subject the engine to a certain definite torque for each throttle setting. It is well known that for any throttle opening such engines operate approximately at maximum efficiency when subjected to a certain load (torque). Since said certain torque is accompanied by a certain manifold vacuum, said vacuum may be utilized to control the transmission in question to cause it to set itself to that drive ratio which makes it possible for the engine to operate at approximately maximum efficiency for each throttle opening.

The rotary two-way valve 82 is normally in the position shown where conduit 81 connects to conduit 81'' which may be but is not necessarily connected to the atmosphere. If open to the atmosphere the interior of the bellows 80 will be at atmospheric pressure and the spring 36d will be relaxed sufficiently to cause the ball 3 to roll to the center of disk 2, which is the neutral position. However, when the operator depresses the accelerator pedal 88, the two-way valve is shifted to the dotted line position, subjecting the interior of the bellows 80 to the vacuum existing in the intake circuit and thereby placing the transmission under the control of the manifold pressure. This will continue until the operator desires to stop the vehicle which involves releasing the accelerator pedal and applying the brake. During this period, due to the flaccidity of spring 36d and the effect of torque transmitted from disk 2 to disk 1, the ball will be caused to roll to the center of disk 2 where the engine may continue to rotate while the vehicle is stationary.

It will be seen that the means described, whether taken alone or supplemented by other manual or automatic controls, will serve admirably to provide an effective and efficient transmission for motor vehicles. It is to be understood that the shaft 25 may drive mechanism of the type shown in Figs. 7 to 10 for applying a compressive force to the ball in proportion to the tangential forces acting thereon.

It is obvious to those skilled in the art that the device illustrated in Fig. 11 may be modified in many ways without changing its basic operation. As one example, the center of oscillation Z of the cage arm 37 may be made to coincide during running operation with the center of disk 1, and through means, not shown, manually operated or automatic, the point Z may be lowered to produce the initial acceleration of the automobile. For example, a foot pedal could, through suitable linkage not shown, be used to lower the point Z to cause an acceleration of the automobile from rest, the acceleration being proportional to the force applied to this auxiliary pedal.

*Fig. 12*

This figure illustrates a modified form of spring mechanism useful in the control of the cage in the various forms of construction illustrated above. In the earlier forms the spring, such as spring 15 of Fig. 6, spring 36 of Figs. 7 and 10, and spring 36d of Fig. 11, is capable of exerting a force (torque) upon the cage only in one direction. In certain forms of application it may be desirable to bias the cage to its central position by means which will resist movement of the cage from said central position in either direction. This may be accomplished for example by a centralizing device such as that illustrated in Fig. 12 which may be substituted for the springs 15, 36 or 36d. Therein 4e designates a constraining cage for the ball 3 pivoted at Z, and having an extension 37e. 94 designates a stationary support to which is pivoted as at 95 an equalizing lever 96 lying closely adjacent arm 37e and being provided with an engaging member such as a knife-edge 97 overlying the arm 37e and also having a second engaging member, such as a knife-edge 98, underlying the arm 37e. A spring 36e biases the centralizing lever 96 clockwise. It will be noted that spring 36e is subjected to its least tension in the position of the parts shown. If, however, the ball 3 exerts an upward thrust, the cage will be rotated counterclockwise, which movement through member 97 will rock lever 96 counterclockwise, tensioning spring 36e. It will also be noted that if the ball 3 applies a downward thrust to the cage the cage will move clockwise but through engagement of arm 37e with the engaging member 98 the centralizing lever 96 will again be rocked counterclockwise, tensioning spring 36e. It will be noted that member 96 moves counterclockwise upon motion of the cage in either clockwise or counterclockwise direction. By this means the spring 36e will cause the cage to remain in its central position until sufficient force is applied to the cage in one direction or the other to overcome the action of spring 36e.

If it is desired to have the action of spring 36e upon the cage equal in either direction of movement of the cage, the parts should be designed in such a way that the dimensions given have the relationship $$\frac{J}{K} = \frac{L}{M}$$

While I have illustrated and described several forms of construction capable of illustrating the principles of my invention, it is obvious that many variations and modifications thereof will occur to those skilled in the art to which the invention appertains. I therefore do not wish to be limited to the constructions set forth but desire to include such variations and modifications as come within the scope of the appended claims.

I claim:

1. In a power transmission, an input and an output shaft parallel to but spaced from each other, disks attached to each of said shafts parallel to and overlapping each other, a roll between said disks, and a constraining member lying between said disks and acting to determine the position of said roll, together with means for clamping said roll between said disks and means actuated by said constraining means to operate said clamping means.

2. The combination according to claim 1 in which said clamp operating means comprises means upon which the constraining means is supported, helical means for applying end thrust to at least one of said disks and means for transmitting forces from said support means to said helical means, whereby forces applied by said ball to said constraining member are applied as end thrust to said disk to clamp the ball in accordance with the force applied by the ball to the constraining means.

3. In a power transmission, an input shaft and an output shaft parallel to but spaced from each other, discs attached to each of said shafts parallel to and overlapping each other, a ball clamped between said discs, and a constraining member lying between said discs and acting as an abutment for said ball, whereby the ball is caused to press against said constraining member with a force equal to the sum of the forces applied tangentially to said ball by said discs, mounting means for said constraining member, means adapted to force one of said discs against said ball to clamp the ball between said discs and connections between said mounting means and said ball clamping means so arranged as to cause said ball clamping means to clamp said ball by a force proportional to the sum of the forces applied tangentially to said ball.

4. In a power transmission, an input shaft and an output shaft parallel to but spaced from each other, discs attached to each of said shafts parallel to and overlapping each other, a ball clamped between said discs, and a constraining member lying between said discs and acting as an abutment for said ball, whereby the ball is caused to press against said constraining member with a force equal to twice the force applied tangentially to said ball by each of said discs, mounting means for said constraining member, means adapted to force one of said discs against said ball to clamp the ball between said discs and connections between said mounting means and said ball clamping means so arranged as to cause said ball clamping means to clamp said ball by a force proportional to the force applied tangentially to said ball by each of said discs.

5. In a power transmission, a fraction disc, a ball bearing against said discs, and a constraining member acting to prevent the ball from moving circumferentially with respect to said disc, whereby the ball is caused to press against said constraining member with a force proportional to the force applied tangentially to said ball by said disc, mounting means for said constraining member, means adapted to press said disc and said ball together and connections between said mounting means and said pressing means so arranged as to cause said pressing means to force said ball against the disc by a force proportional to the force applied tangentially to said ball.

6. In a power transmission, a friction disc, a roll bearing against said disc, and a constraining member acting to prevent the roll from moving circumferentially with respect to said disc, whereby the roll is caused to press against said constraining member with a force proportional to the force applied tangentially to said roll by said disc, mounting means for said contraining member, means adapted to press said disc and said roll together and connections between said mounting means and said pressing means so arranged as to cause said pressing means to force said roll against the disc by a force proportional to the force applied tangentially to said roll.

7. In a power transmission, an input shaft and an output shaft parallel to but spaced from each other, discs attached to each of said shafts parallel to and overlapping each other, a ball clamped between said discs, and a constraining member lying between said discs and acting as an abutment for said ball, whereby the ball is caused to press against said constraining member with a force equal to the sum of the forces applied tangentially to said ball by said discs, mounting means for said constraining member, means adapted to force one of said discs against said ball to clamp the ball between said discs said clamping means comprising a member having at least one helical surface coaxial with said one of said discs and a second member coaxial therewith and having a complementary helical surface bearing against said first helical surface and mounted for rotation upon its axis and that of said disc and connections between said mounting means and said ball clamping means so arranged as to cause said second helical member to tend to rotate, the connections being such as to apply a torque to said second helical member proportional to the sum of the forces applied tangentially to said ball, whereby the ball is clamped by a force proportional to the sum of the forces applied tangentially to said ball.

8. In a power transmission, an input shaft and an output shaft parallel to but spaced from each other, discs attached to each of said shafts parallel to and overlapping each other, a ball clamped between said discs, and a constraining member lying between said discs and formed with parallel abutment surfaces acting to prevent movement of said ball except in a direction generally radial to said discs, whereby the ball is caused to press against said constraining member in a direction determined by the direction of the tangential force applied to the ball and with a force equal to the sum of the forces applied tangentially to said ball by said discs, mounting means for said constraining member, means adapted to force one of said discs against said ball to clamp the ball between said discs, said clamping means and connections between said mounting means and said ball clamping means so arranged as to cause said ball clamping means to cause said ball to be clamped by a force proportional to the sum of the forces applied tangentially to said ball, irrespective of the direction of the tangential forces applied to the ball.

9. In a power transmission, an input shaft and an output shaft parallel to but spaced from each other, discs attached to each of said shafts parallel to and overlapping each other, a ball clamped between said discs, and a constraining member lying between said discs, said constraining member preventing translatory movement of said ball except in a direction parallel with said discs and generally in a plane including the axes of said discs, said constraining member being pivoted for movement in a plane generally parallel with said discs, whereby the ball is caused to press against said constraining member with a force equal to the sum of the forces applied tangentially to said ball by said discs, mounting means for said constraining member fixed to a support shaft and resilient means for restraining pivotal movement of said constraining member connected between said constraining member and a pivoted abutment lever, means for so connecting the pivot of said abutment lever to said support shaft that for a given force acting tangentially on said ball a constant torque will be applied to said support shaft irrespective of the position of the ball, means adapted to force one of said discs against said ball to clamp the ball between said discs and connections from said support shaft to said ball clamping means so arranged as to cause said ball clamping means to clamp said ball by a force proportional to the sum of the forces applied tangentially to said ball.

10. In a power transmission, the combination according to claim 9 in which the said clamping means comprises a member having at least one helical surface coaxial with said one of said discs and a second member coaxial therewith and having a complementary helical surface bearing against said first helical surface and mounted for rotation upon its axis and that of said disc and connections between said mounting means and said ball clamping means so arranged as to cause said second helical member to tend to rotate, the connections being such as to apply a torque to said second helical member proportional to the sum of the forces applied tangentially to said ball, whereby the ball is clamped by a force proportional to the sum of the forces applied tangentially to said ball.

11. In a power transmission, an input shaft and an output shaft parallel to but spaced from each other, discs attached to each of said shafts parallel to and overlapping each other, a ball clamped between said discs, and a constraining member lying between said discs, said constraining member preventing translatory movement of said ball except in a direction parallel with said discs and generally in a plane including the axes of said discs, said constraining member being capable of movement in a plane generally parallel with said discs, whereby the ball is caused to press against said constraining member with a force equal to the sum of the forces applied tangentially to said ball by said discs, mounting means for said constraining member, means adapted to force one of said discs against said ball to clamp the ball between said discs and connections between said mounting means and said ball clamping means so arranged as to cause said ball clamping means to clamp said ball by a force proportional to the sum of the forces applied tangentially to said ball.

12. In a power transmission, an input shaft and an output shaft parallel to but spaced from each other, discs attached to each of said shafts parallel to and overlapping each other, a ball clamped between said discs, and a constraining member lying between said discs, said constraining member preventing translatory movement of said ball except in a direction parallel with said discs and generally in a plane including the axes of said discs, said constraining member being capable of movement in a plane generally parallel with said discs, whereby the ball is caused to press against said constraining member in a direction dependent upon the direction of said tangential force and with a force equal to the sum of the forces applied tangentially to said ball by said discs, mounting means for said constraining member, means adapted to force one of said discs against said ball to clamp the ball between said discs and connections between said mounting means and said ball clamping means so arranged as to cause said ball clamping means to clamp said ball by a force proportional to the sum of the forces applied tangentially to said ball irrespective of the direction of said tangential force.

ROBERT H. DICKE.

REFERENCES CITED

The following references are of record in the file of this patent:

UNITED STATES PATENTS

| Number | Name | Date |
|---|---|---|
| 617,738 | Hale | Jan. 17, 1899 |
| 1,384,357 | Spencer et al. | July 12, 1921 |
| 1,963,880 | Barthelemy | June 19, 1934 |

FOREIGN PATENTS

| Number | Country | Date |
|---|---|---|
| 467,198 | France | Mar. 23, 1914 |
| 667,323 | France | Oct. 15, 1929 |
| 788,778 | France | Oct. 16, 1935 |